US011913609B2

(12) United States Patent
Cisneros et al.

(10) Patent No.: US 11,913,609 B2
(45) **Date of Patent: *Feb. 27, 2024**

(54) OVULAR DOUBLE-ENDED LIGHT EMITTING DIODE (LED) BULB

(71) Applicant: Feit Electric Company, Inc., Pico Rivera, CA (US)

(72) Inventors: Gerardo Cisneros, Buena Park, CA (US); Hoang Pham, Diamond Bar, CA (US)

(73) Assignee: Feit Electric Company, Inc., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,261

(22) Filed: Mar. 15, 2023

(65) Prior Publication Data

US 2023/0213153 A1 Jul. 6, 2023

Related U.S. Application Data

(63) Continuation of application No. 17/574,046, filed on Jan. 12, 2022, now Pat. No. 11,635,174, which is a (Continued)

(51) Int. Cl.

*F21K 9/237* (2016.01)
*F21V 29/77* (2015.01)

(Continued)

(52) U.S. Cl.

CPC .............. *F21K 9/237* (2016.08); *F21V 23/06* (2013.01); *F21V 29/773* (2015.01); *F21K 9/272* (2016.08);

(Continued)

(58) Field of Classification Search

CPC . F21K 9/237; F21K 9/27; F21K 9/272; F21K 9/275; F21K 9/278; F21S 4/28; F21S 8/04; F21V 29/773; F21V 3/02

See application file for complete search history.

(56) References Cited

U.S. PATENT DOCUMENTS

| | | | |
|---|---|---|---|
| 7,520,640 | B1 | 4/2009 | Shuai et al. |
| 8,287,144 | B2 | 10/2012 | Pedersen et al. |

(Continued)

FOREIGN PATENT DOCUMENTS

| | | | |
|---|---|---|---|
| CN | 110671680 | A | 1/2020 |
| WO | WO-2011/025235 | A2 | 3/2011 |

*Primary Examiner* — Erin Kryukova
(74) *Attorney, Agent, or Firm* — Alston & Bird LLP

(57) ABSTRACT

An LED light module comprises an emitting portion; at least one LED package; a back cover; and an end cap. The emitting portion defines a first curved surface. The first curved surface extends a first length along a cylindrical axis defined by the LED light module. The back cover defines a second curved surface extending the first length along the cylindrical axis. The first curved surface and the second curved surface define a perimeter of the LED light module. In a cross-section of the LED light module taken in a plane substantially perpendicular to the cylindrical axis, the perimeter is substantially ovular, elliptical and/or tear-drop shaped. The end cap is substantially ovular, elliptical and/or tear-drop shaped, and comprises a coupling element configured to electrically and/or mechanically couple the LED light module to a subsequent LED light module or to a fixture.

20 Claims, 14 Drawing Sheets

Related U.S. Application Data continuation of application No. 16/662,411, filed on Oct. 24, 2019, now Pat. No. 11,255,490.

(51) Int. Cl.

| | |
|---|---|
| ***F21V 23/06*** | (2006.01) |
| ***F21Y 115/10*** | (2016.01) |
| ***F21Y 107/20*** | (2016.01) |
| ***F21Y 107/30*** | (2016.01) |
| ***F21S 4/28*** | (2016.01) |
| ***F21K 9/275*** | (2016.01) |
| ***F21K 9/272*** | (2016.01) |
| ***F21K 9/278*** | (2016.01) |

(52) U.S. Cl.

CPC .............. *F21K 9/275* (2016.08); *F21K 9/278* (2016.08); *F21S 4/28* (2016.01); *F21Y 2107/20* (2016.08); *F21Y 2107/30* (2016.08); *F21Y 2115/10* (2016.08)

(56) References Cited

U.S. PATENT DOCUMENTS

| | | | | |
|---|---|---|---|---|
| 11,041,608 | B2 | 6/2021 | Vang et al. | |
| 11,047,536 | B2 | 6/2021 | Zheng et al. | |
| 11,255,490 | B2 | 2/2022 | Cisneros et al. | |
| 11,635,174 | B2 | 4/2023 | Cisneros et al. | |
| 2011/0140586 | A1* | 6/2011 | Wang | F21V 29/83 313/46 |
| 2011/0176297 | A1 | 7/2011 | Hsia et al. | |
| 2011/0181166 | A1* | 7/2011 | Chen | F21K 9/232 313/46 |
| 2012/0176797 | A1* | 7/2012 | Stolte | F21V 29/75 165/185 |
| 2012/0188756 | A1 | 7/2012 | Kokoski et al. | |
| 2013/0208458 | A1 | 8/2013 | Huang et al. | |
| 2014/0119001 | A1 | 5/2014 | Zhang et al. | |
| 2014/0301081 | A1 | 10/2014 | Lin | |
| 2015/0049475 | A1 | 2/2015 | Pan et al. | |
| 2015/0276139 | A1 | 10/2015 | Rowlette, Jr. et al. | |
| 2016/0230941 | A1 | 8/2016 | Halliwell | |
| 2017/0023224 | A1 | 1/2017 | Speer et al. | |
| 2017/0227174 | A1 | 8/2017 | May | |
| 2018/0266662 | A1* | 9/2018 | Yifan | F21V 17/06 |
| 2020/0096162 | A1 | 3/2020 | May | |
| 2021/0123571 | A1 | 4/2021 | Cisneros et al. | |
| 2022/0136662 | A1 | 5/2022 | Cisneros et al. | |

* cited by examiner

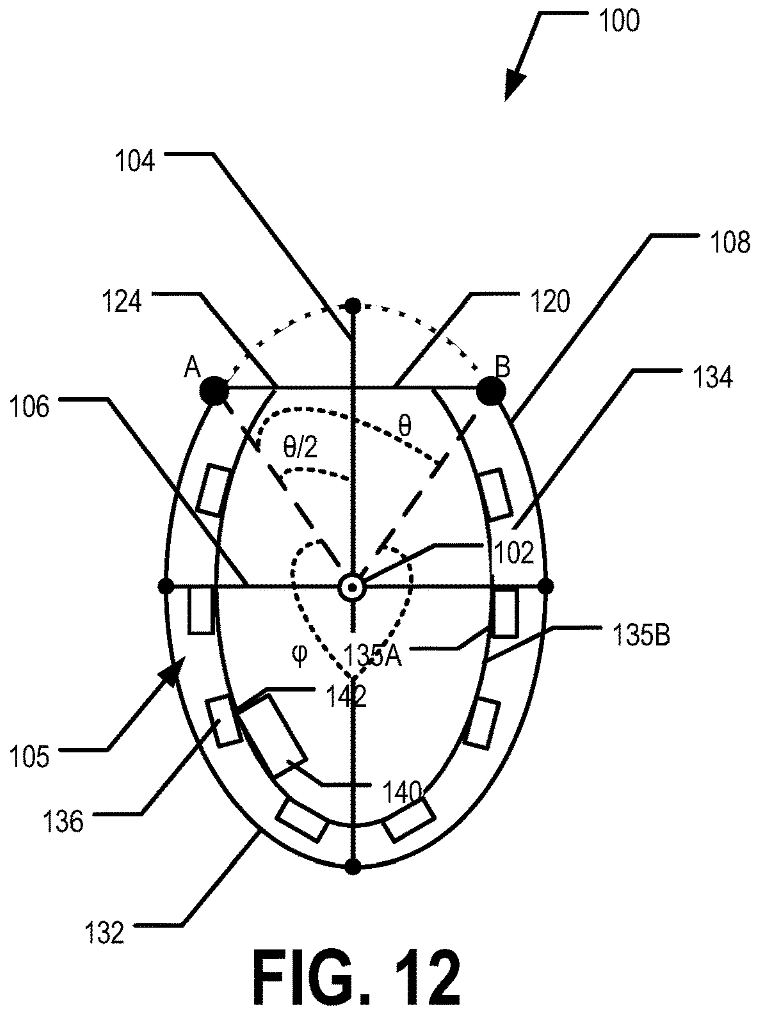
FIG. 12
FIG. 13
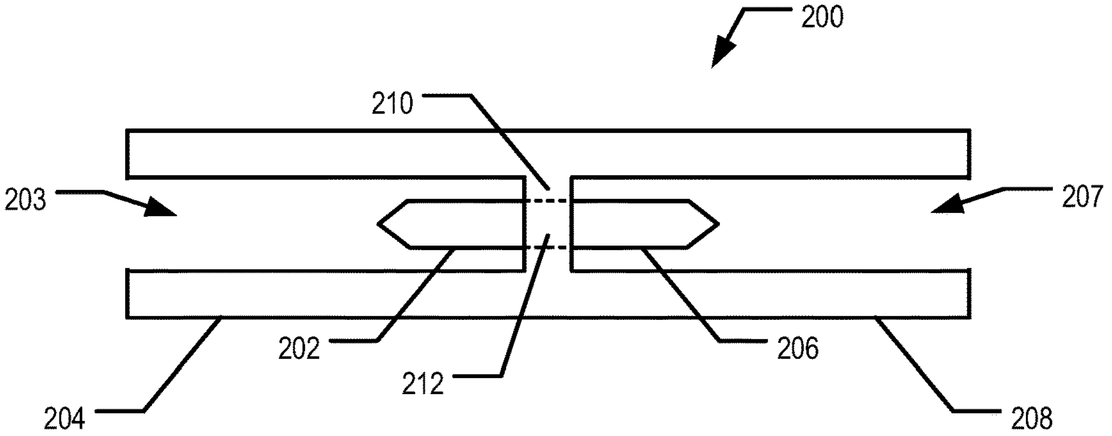

OVULAR DOUBLE-ENDED LIGHT EMITTING DIODE (LED) BULB

CROSS-REFERENCE TO RELATED APPLICATIONS

This application is a continuation of U.S. patent application Ser. No. 17/574,046, titled "OVULAR DOUBLE-ENDED LIGHT EMITTING DIODE (LED) BULB," filed Jan. 12, 2022, which is a continuation of U.S. patent application Ser. No. 16/662,411, titled "OVULAR DOUBLE-ENDED LIGHT EMITTING DIODE (LED) BULB," filed Oct. 24, 2019, now U.S. Pat. No. 11,255,490, the entire contents of each of which are hereby incorporated by reference.

BACKGROUND

Progress in the field of engineering and manufacturing light emitting diodes (LEDs) has resulted in an increased interest in employing LED lamps in general lighting applications. Particularly, an interest exists in replacing fluorescent lamp tubes with LED lamp tubes. LED lamp tubes offer several advantages over traditional fluorescent lamp tubes. For example, LED lamps have a significantly longer life than fluorescent lamps and do not contain the dangerous chemicals that fluorescent lights depend upon for their fluorescence. Also, LED lamps require significantly less electrical energy compared to fluorescent lamps.

BRIEF SUMMARY

Embodiments of the present invention provide an LED bulb or lamp and/or a light module. Various embodiments provide an ovular double-ended LED bulb or lamp. For example, a cross-section of the ovular double-ended LED bulb or lamp may be substantially ovular, elliptical, and/or tear-drop shaped, in various embodiments. For example, the ovular double-ended LED bulb or lamp may comprise an end cap on each end of the bulb or lamp with each end cap having a coupling element extending therefrom, in an example embodiment.

Various embodiments provide an LED lamp and/or light module configured for use as a tube lamp. In various embodiments, two or more LED lamps and/or light modules may be coupled to provide a combined LED lamp and/or light module. In various embodiments, an LED lamp and/or light module (or combined LED lamp and/or light module) may be coupled into a lighting fixture. In various embodiments, the LED lamp and/or light module has an ovular, elliptical, and/or tear-drop shaped cross-section in a plane that is substantially parallel to a cylindrical axis defined by the LED lamp and/or light module. In various embodiments, the ovular, elliptical, and/or tear-drop shape of the cross-section allows the LED lamp and/or light module to provide light with improved directionality of the emitted light, compared to traditional tube lamps. In various embodiments, the emitting portion of the LED lamp and/or light module extends only a portion of the way around the perimeter of the LED lamp and/or light module (e.g., less than 360° around the cylindrical axis defined by the LED lamp and/or light module). For example, LED packages may be disposed around only a fraction (e.g., less than 100%) of the perimeter of the LED lamp and/or light module (e.g., less than 360° around the cylindrical axis defined by the LED lamp and/or light module). Various embodiments therefore provide for further improved directionality of the light emitted by the LED lamp and/or light module and less light (e.g., energy) that is wasted by emitting light in inappropriate directions. Various embodiments further provide for improved heat dissipation (e.g., through a non-light emitting back cover) to allow for improved performance of the LED packages and/or driver circuitry.

In accordance with one aspect of the present invention, an LED light module is provided. In an example embodiment, the LED light module comprises an emitting portion; at least one LED package; a back cover; and at least one end cap. The emitting portion defines a first curved surface. The first curved surface extends a first length along a cylindrical axis defined by the LED light module. The at least one LED package is disposed within the LED light module so as to emit light outward from the emitting portion. The back cover defines a second curved surface extending the first length along the cylindrical axis. The first curved surface and the second curved surface define a perimeter of the LED light module. In a cross-section of the LED light module taken in a plane substantially perpendicular to the cylindrical axis, the perimeter is substantially ovular, elliptical and/or tear-drop shaped. The at least one end cap is substantially ovular, elliptical and/or tear-drop shaped, and comprises a coupling element configured to electrically and/or mechanically couple the LED light module to a subsequent LED light module or to a fixture.

In accordance with another aspect of the present invention, a combined LED light module is provided. In an example embodiment, the combined LED light module comprises at least two electrically and/or mechanically coupled LED light modules. For example, the at least two electrically and/or mechanically coupled LED light modules may be coupled via a connector electrically and/or mechanically coupled to a coupling element of each of the at last two LED light modules. Each LED light module comprises an emitting portion; at least one LED package; a back cover; and at least one end cap. The emitting portion defines a first curved surface. The first curved surface extends a first length along a cylindrical axis defined by the LED light module. The at least one LED package is disposed within the LED light module so as to emit light outward from the emitting portion. The back cover defines a second curved surface extending the first length along the cylindrical axis. The first curved surface and the second curved surface define a perimeter of the LED light module. In a cross-section of the LED light module taken in a plane substantially perpendicular to the cylindrical axis, the perimeter is substantially ovular, elliptical and/or tear-drop shaped. The at least one end cap is substantially ovular, elliptical and/or tear-drop shaped, and comprises a coupling element configured to electrically and/or mechanically couple the LED light module to a subsequent LED light module or to a fixture.

In accordance with yet another aspect of the present invention, an LED lighting fixture is provided. In an example embodiment, the LED lighting fixture comprises a fixture configured to have at least one LED light module installed therein; and the at least one LED light module electrically and/or mechanically coupled to the fixture. In an example embodiment, the at least one LED light module is electrically and/or mechanically coupled to the fixture via at least one coupling element of the at least one LED light module. The LED light module comprises an emitting portion; at least one LED package; a back cover; and at least one end cap. The emitting portion defines a first curved surface. The first curved surface extends a first length along a cylindrical axis defined by the LED light module. The at least one LED package is disposed within the LED light module so as to emit light outward from the emitting portion. The back cover defines a second curved surface extending the first length along the cylindrical axis. The first curved surface and the second curved surface define a perimeter of the LED light module. In a cross-section of the LED light module taken in a plane substantially perpendicular to the cylindrical axis, the perimeter is substantially ovular, elliptical and/or tear-drop shaped. The at least one end cap is substantially ovular, elliptical and/or tear-drop shaped, and comprises a coupling element configured to electrically and/or mechanically couple the LED light module to a subsequent LED light module or to a fixture.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 12 is a cross-section of an LED lamp and/or light module taken in a plane substantially perpendicular to the cylinder axis defined by the LED lamp and/or light module, in accordance with an example embodiment;

Figure 1:
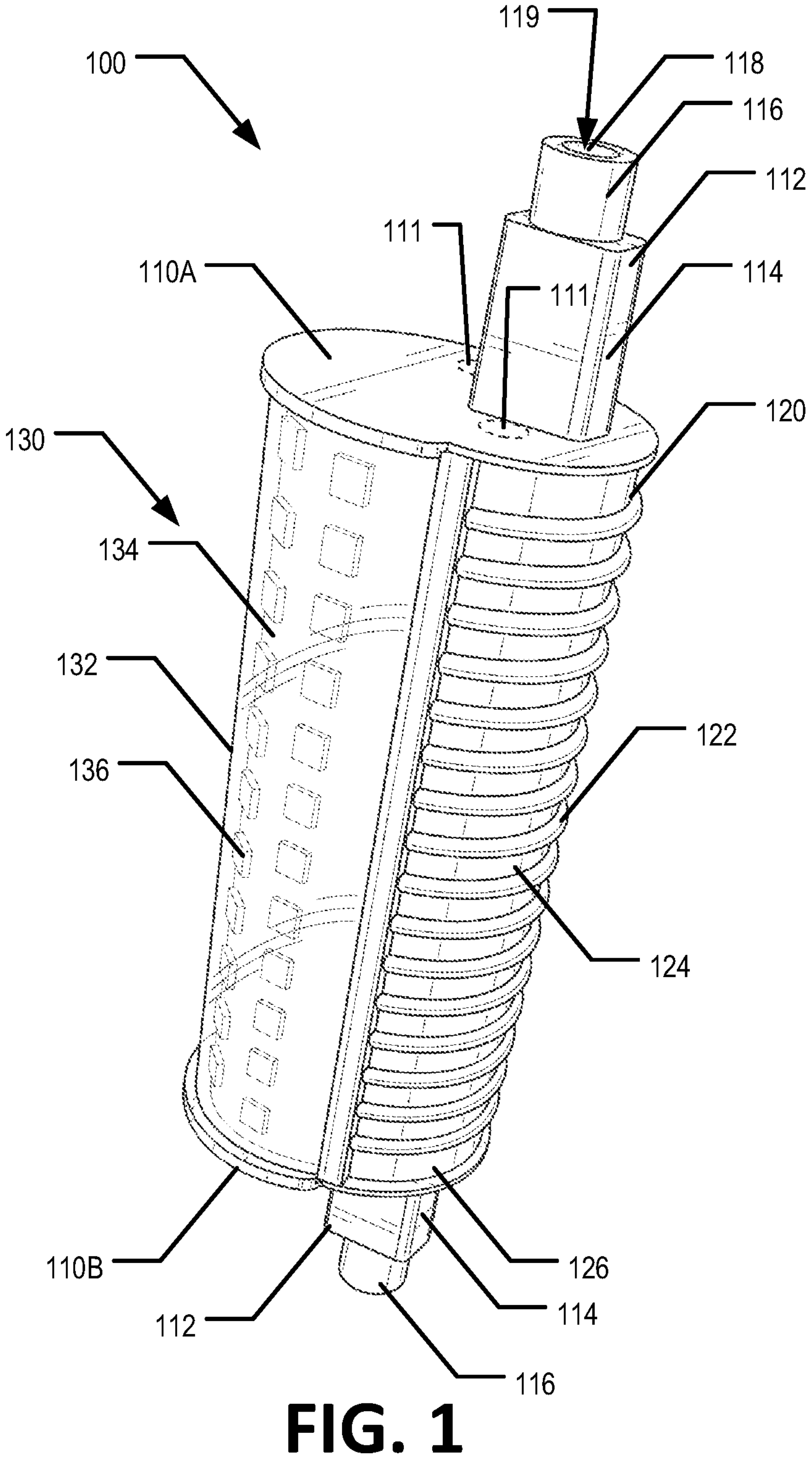
FIG. 1 is a perspective view of an LED lamp and/or light module, in accordance with an example embodiment.
Figure 2:
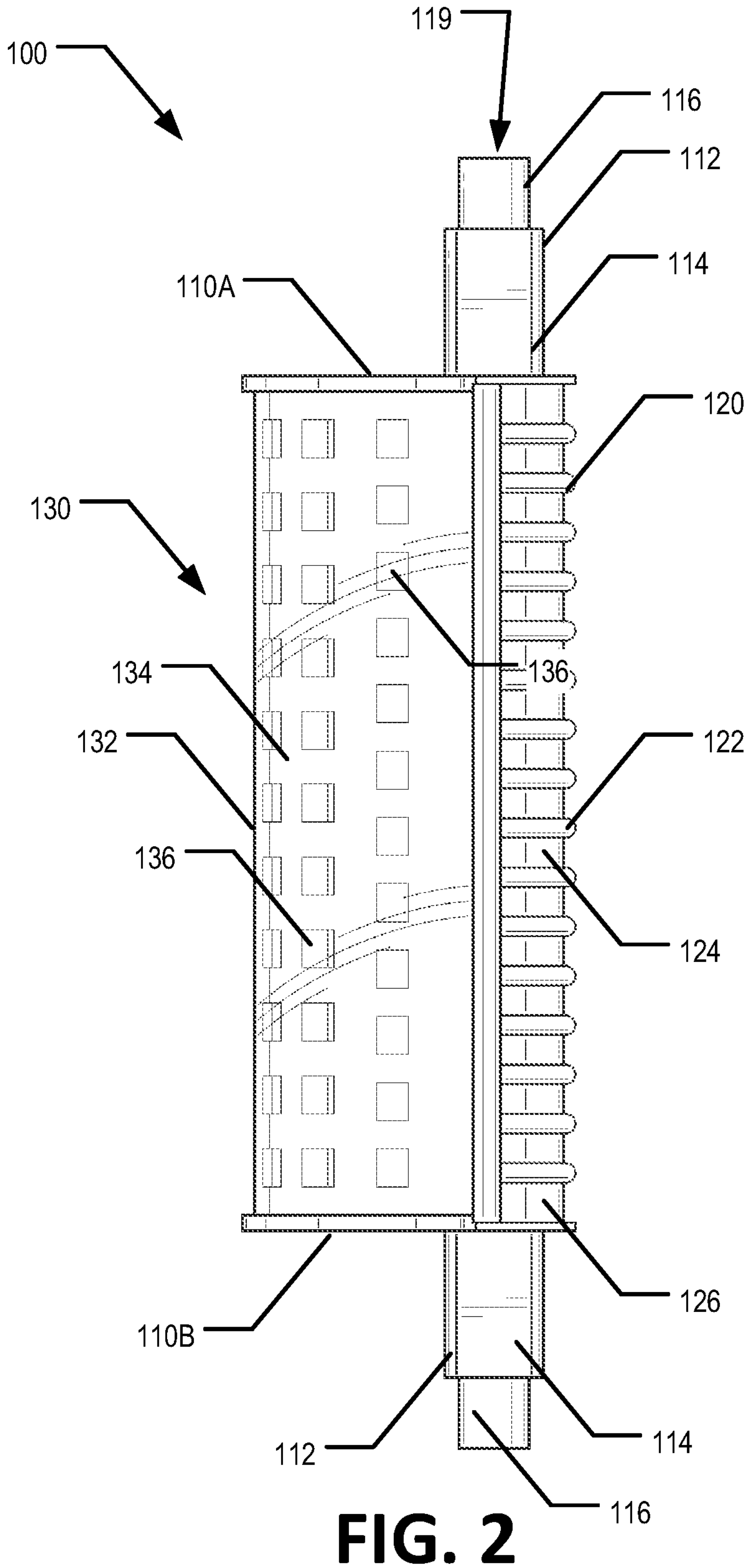
FIG. 2 is a right side view of the LED lamp and/or light module shown in FIG. 1.
Figure 3:
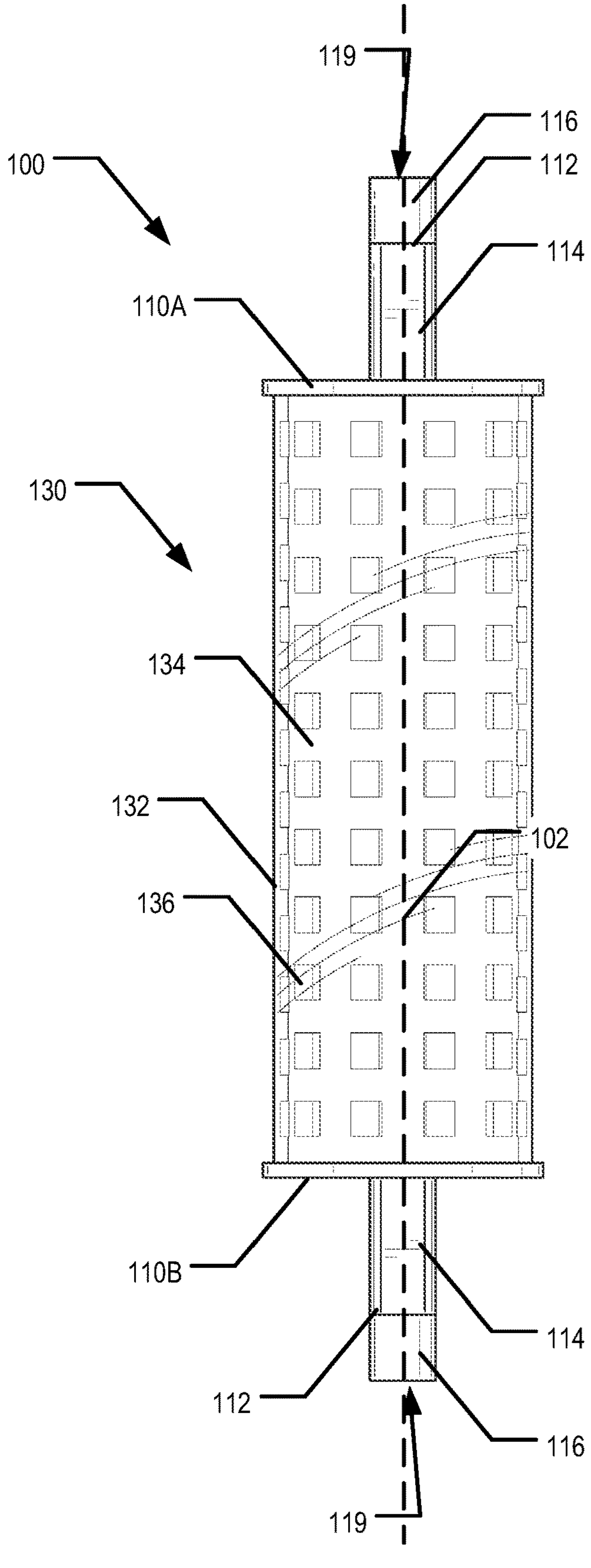
FIG. 3 is a front view of the LED lamp and/or light module shown in FIG. 1.
Figure 4:
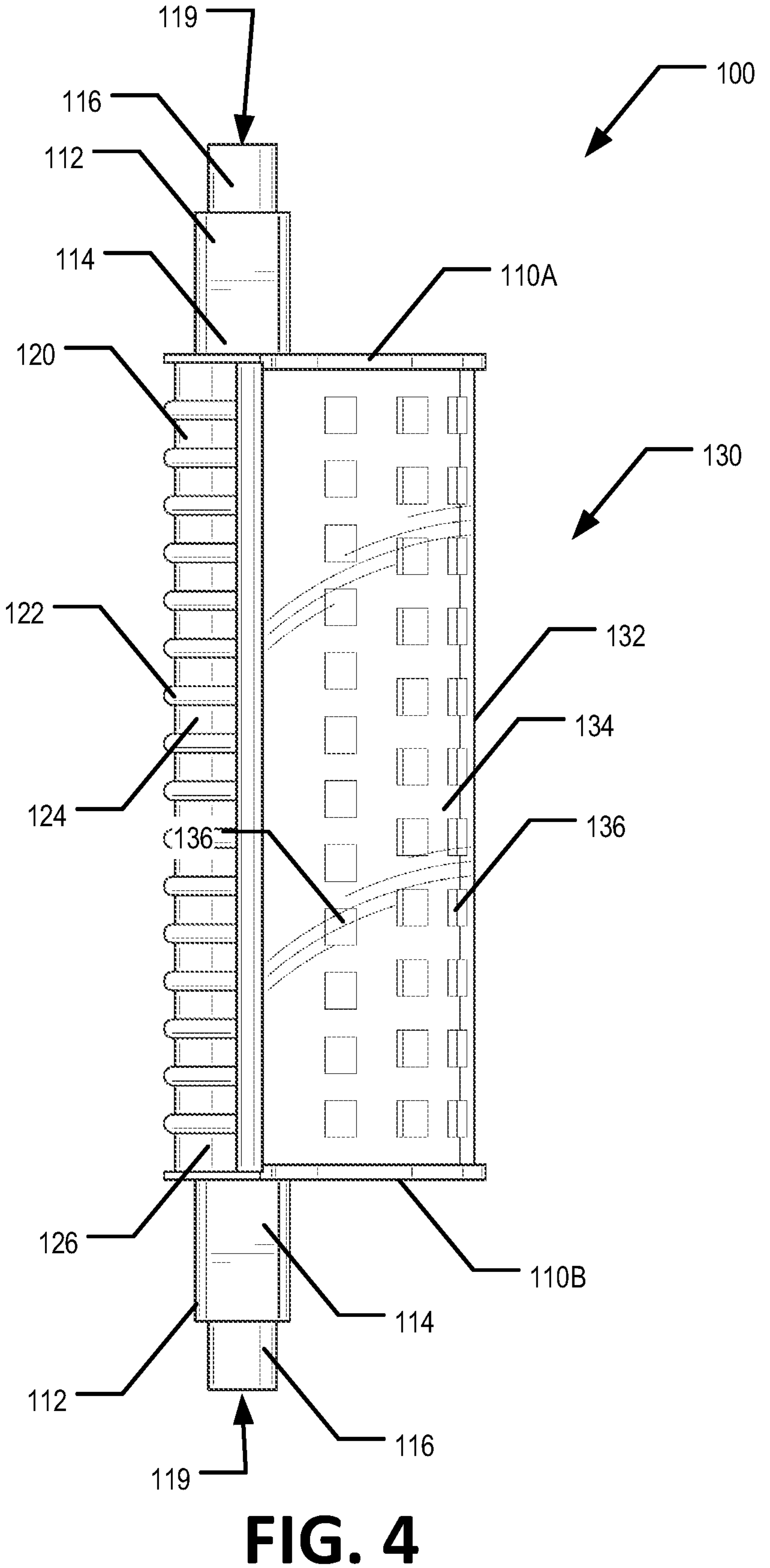
FIG. 4 is a left side view of the LED lamp and/or light module shown in FIG. 1.
Figure 5:
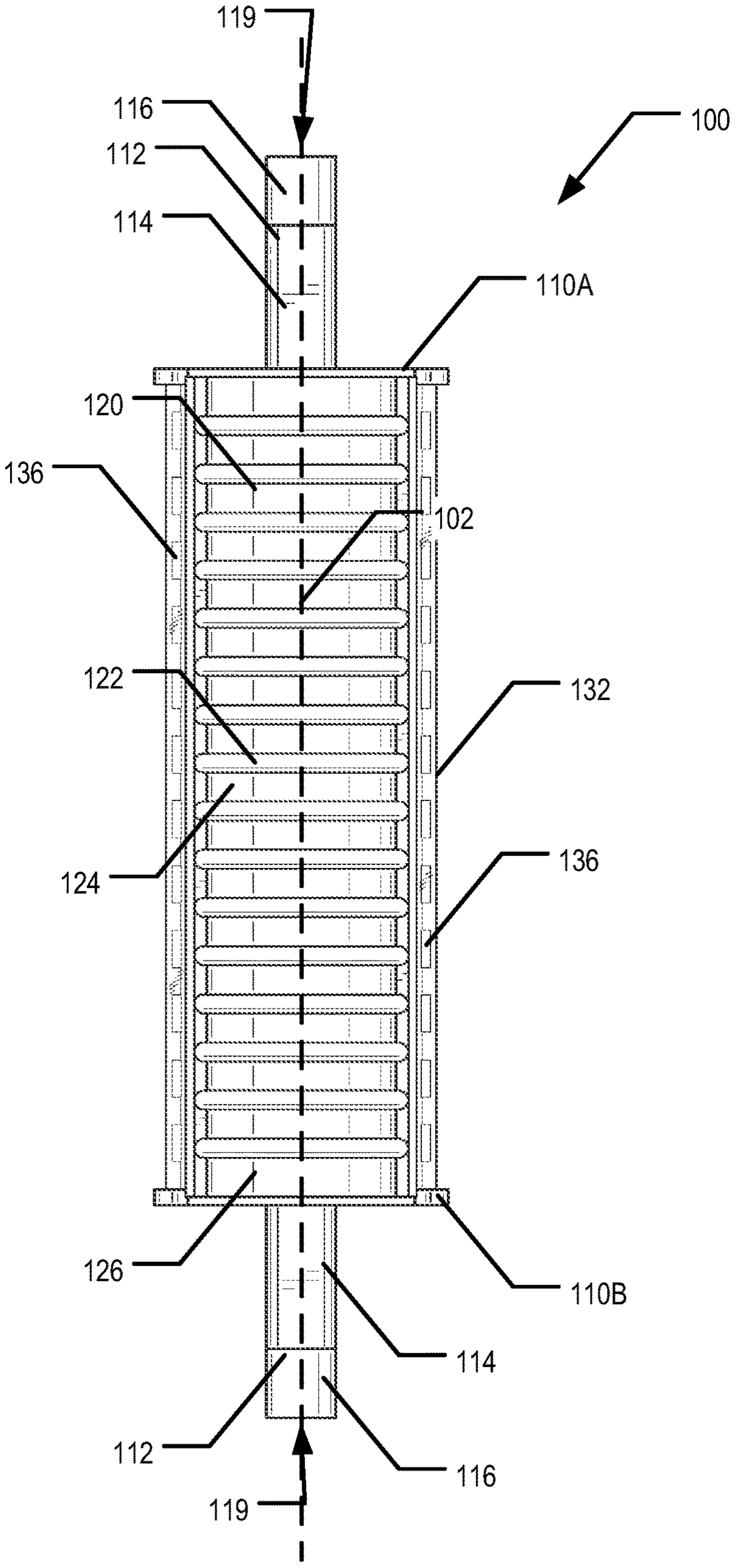
FIG. 5 is a back view of the LED lamp and/or light module shown in FIG. 1.
Figure 6:
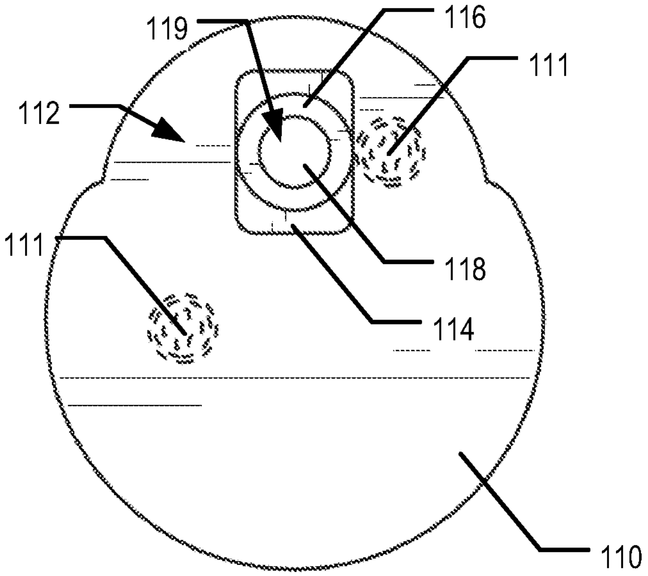
FIG. 6 is a top plan view of the LED lamp and/or light module shown in FIG. 1.
Figure 7:
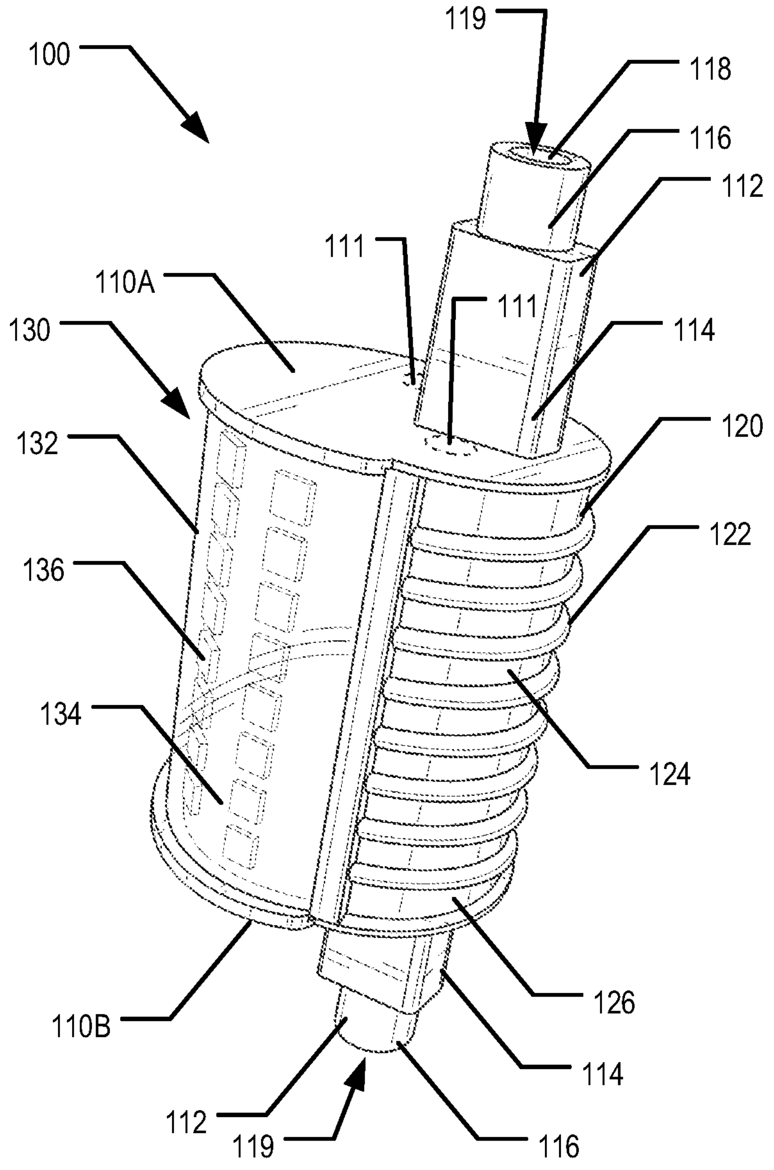
FIG. 7 is a perspective view of an LED lamp and/or light module, in accordance with another example embodiment.
Figure 8:
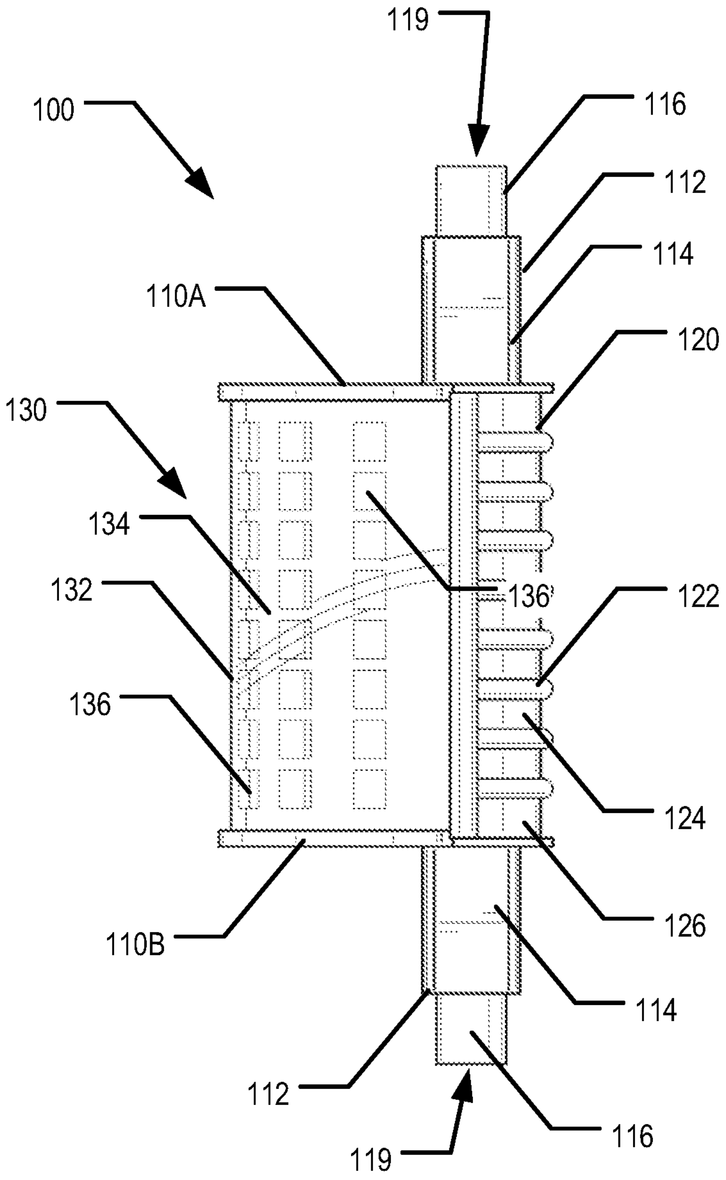
FIG. 8 is a right side view of the LED lamp and/or light module shown in FIG. 7.
Figure 9:
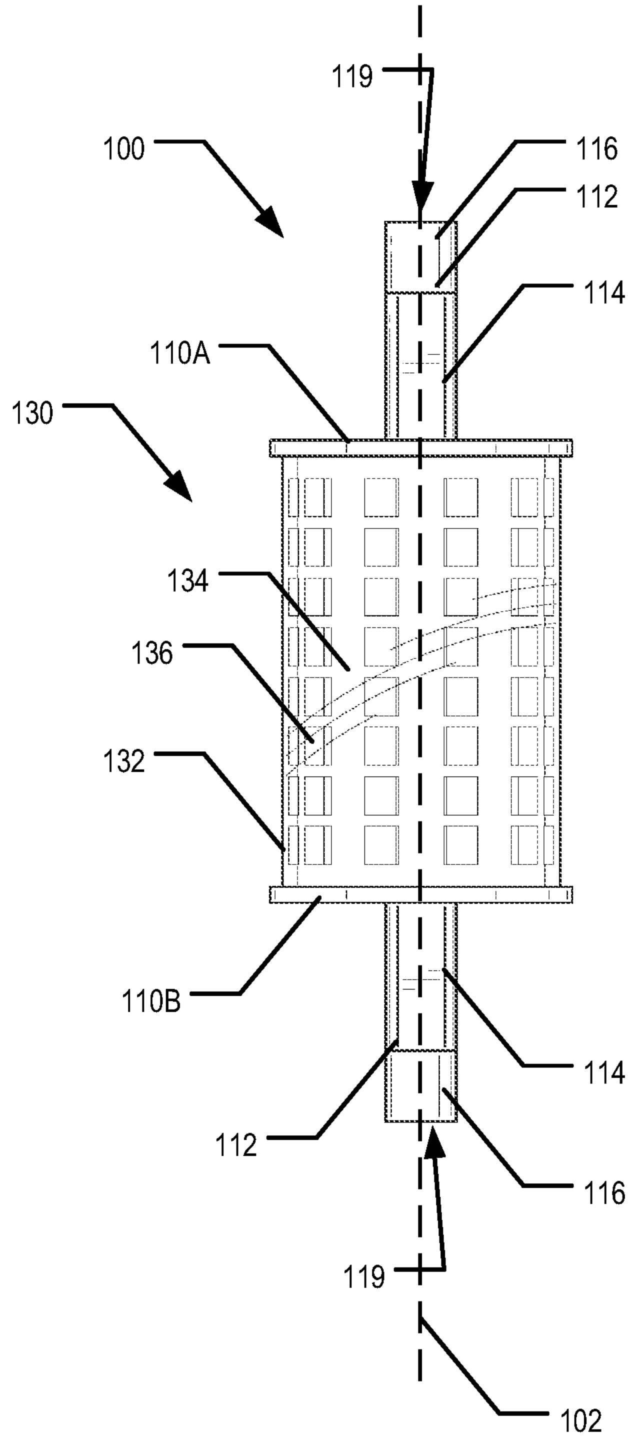
FIG. 9 is a front view of the LED lamp and/or light module shown in FIG. 7.
Figure 10:
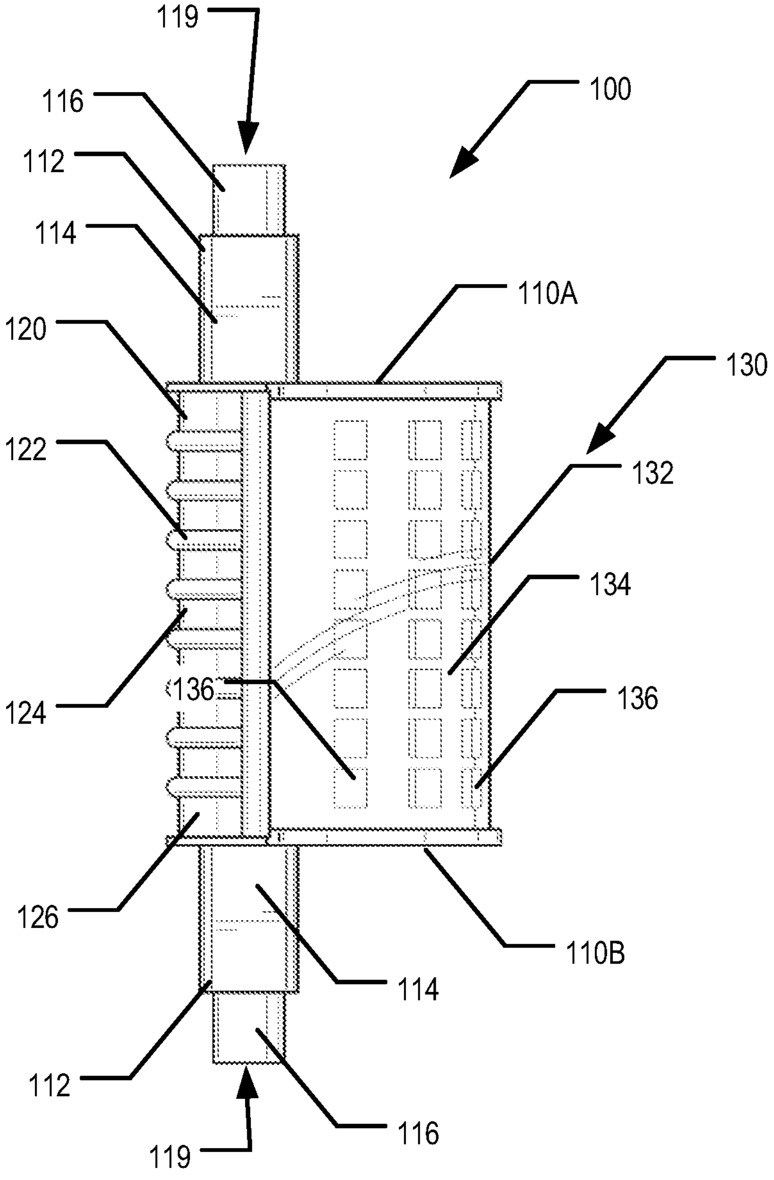
FIG. 10 is a left side view of the LED lamp and/or light module shown in FIG. 7.
Figure 11:
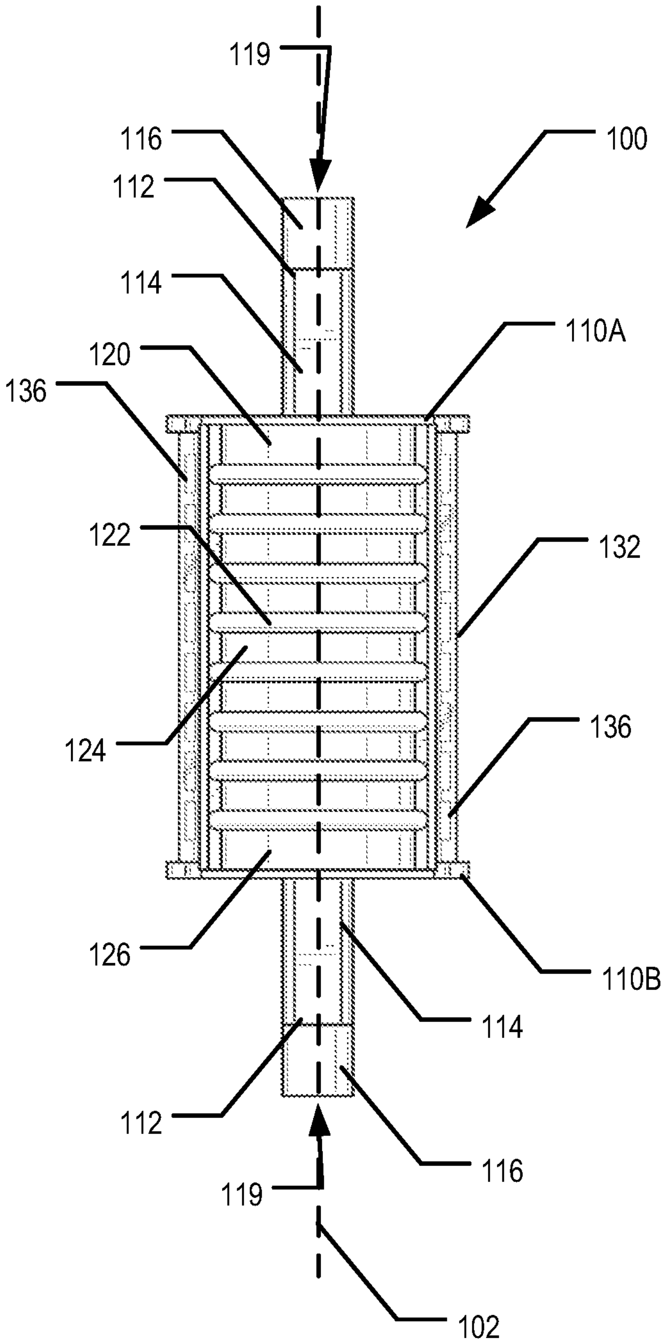
FIG. 11 is a back view of the LED lamp and/or light module shown in FIG. 7.
Figure 14:
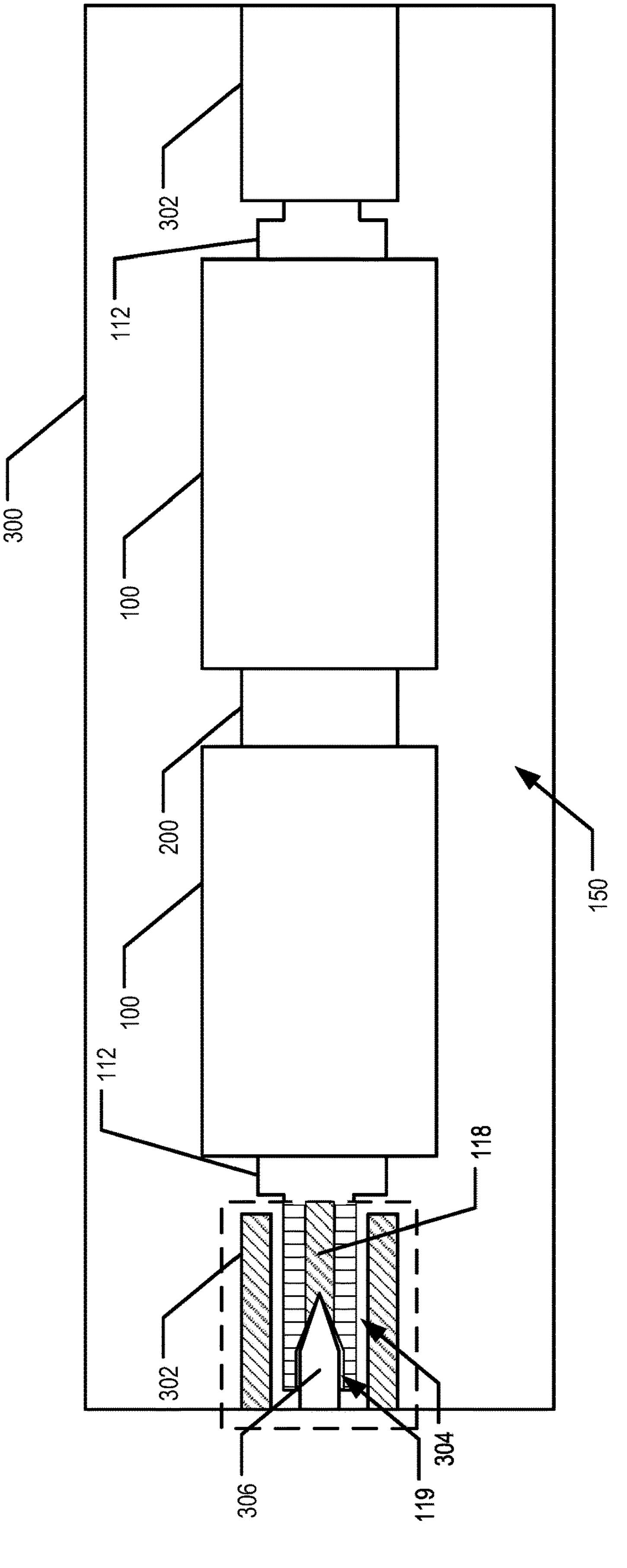

FIG. 13 is a cross-section of a connector that may be used to connect a first LED lamp and/or light module and a second LED lamp and/or light module to form a combined LED lamp and/or light module, in accordance with an example embodiment, where the cross-section is taken in a plane that is substantially parallel to a cylinder axis defined by an LED lamp and/or light module when the LED lamp and/or light module is coupled to the connector; and FIG. 14 illustrates a partial cross-section of a combined LED lamp and/or light module installed in a lighting fixture, in accordance with an example embodiment.

Figure 15:
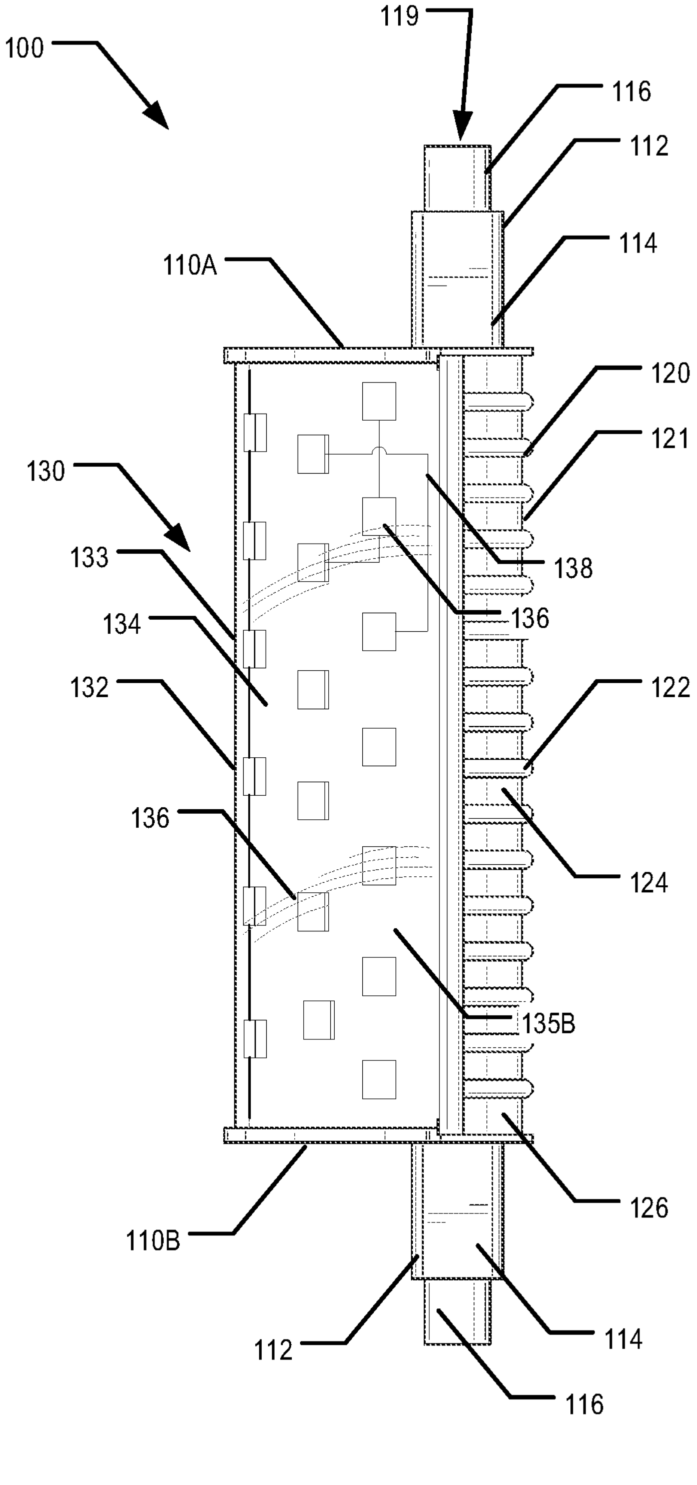

FIG. 15 is a right-side view of an example embodiment of a LED lamp and/or light module.

DETAILED DESCRIPTION OF VARIOUS EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The term "approximately" refers to within engineering and/or manufacturing limits. Like numbers refer to like elements throughout.

Example embodiments of the present invention provide an LED lamp and/or light module. In various embodiments, the LED lamp and/or light module is configured for use in tube lamp applications. FIGS. 1-14 provide various views of an example embodiment of an LED lamp and/or light module 100. In various embodiments, the LED lamp and/or light module 100 comprises a first end cap 110A and a second end cap 110B, and a back cover 120 and an emitting portion 130 that each extend from the first end cap 110A to the second end cap 110B. In various embodiments, at least one coupling element 112 extends outward from each of the first and second end caps 110A, 110B.

In various embodiments, the back cover 120 and an envelope 132 of the emitting portion define the perimeter of the LED lamp and/or light module 100. In various embodiments the envelope 132 may define a first curved surface 133, as shown in FIG. 15. In various embodiments, the back cover 120 may define a second curved surface 121. The envelope 132 may extend from the first end cap 110A to the second end cap 110B. In various embodiments, the perimeter of the LED lamp and/or module 100 defined by the back cover 120 and the envelope 132 is enclosed on the ends by the first and second end caps 110A, 110B. For example, the back cover 120 and the envelope 132 may define a cylinder that is capped at a first end by the first end cap 110A and at a second end, opposite the first end, by the second end cap 110B. In various embodiments, a cylinder axis 102 is defined that is substantially normal to a surface of the first end cap 110, substantially normal to the surface of the second end cap 110B, substantially parallel to the back cover 120, and substantially parallel to the envelope 132. A cross-section of the LED lamp and/or light module 100 taken in a plane substantially perpendicular to the cylinder axis 102 is substantially ovular, elliptical, and/or tear-drop. For example, the cross-section of the LED lamp and/or light module 100 taken in a plane substantially perpendicular to the cylinder axis 102 may define a major axis 104 and a minor axis 106. The major axis 104 is greater (e.g., longer) than the minor axis 106.

In various embodiments, the end caps 110A, 110B define a length d of the LED lamp and/or light module 100. In various embodiments, the length d of the LED lamp and/or light module 100 is four feet or less. In various embodiments, the length d of the LED lamp and/or light module 100 is two feet or less. In various embodiments, the length d of the LED lamp and/or light module 100 is one foot or less. In various embodiments, the length d of the LED lamp and/or light module 100 is the range of 8 inches to one inch. For example, in an example embodiment, the length d of the LED lamp and/or light module 100 is approximately 3 inches. In an example embodiment, the length d of the LED lamp and/or light module 100 is approximately 2 inches (e.g., one and three quarters inches).

In various embodiments, the major axis 104 of the LED lamp and/or light module 100 is six inches or less. In various embodiments, the major axis 104 of the LED lamp and/or light module 100 is two inches or less. In various embodiments, the major axis 104 of the LED lamp and/or light module is in the range of half an inch to three inches. For example, in an example embodiment, the major axis 104 of the LED lamp and/or light module is approximately one and a half inches. In various embodiments, the minor axis 106 of the LED lamp and/or light module 100 is less (e.g., shorter) than the major axis 104. For example, in various embodiments, the minor axis 106 of the LED lamp and/or light module 100 is four inches or less. In various embodiments, the minor axis 106 of the LED lamp and/or light module 100 is two inches or less. In various embodiments, the minor axis 106 of the LED lamp and/or light module 100 is in the range of one quarter of an inch to two inches. For example, in an example embodiment, the minor axis 106 is approximately one inch. In one example embodiment, the major axis 104 is in the range of one inch to one and three quarter inches and the minor axis 106 is in the range of half an inch to one and a quarter inches.

Various aspects of example embodiments, of an LED lamp and/or light module 100 will now be described in more detail.

Exemplary Back Cover

In various embodiments, the LED lamp and/or light module 100 comprises a back cover 120 that extends between the first end cap 110A and the second end cap 110B. In various embodiments, the back cover 120 provides no more than half (e.g., <50%) of the perimeter of the LED lamp and/or light module 100. For example, in a cross-section of the LED lamp and/or light module 100 taken in a plane perpendicular to the cylinder axis 102, the back cover 120 may provide an arc that is approximately half or less of the oval, ellipse, and/or tear-drop of the cross-section perimeter 108. For example, the back cover 120 may extend from a first point A located on a first side of the intersection of the minor axis 106 and the cross-section perimeter 108 to a second point B located on the first side of an opposite intersection of the minor axis 106 and the cross-section perimeter 108. The angular measure θ between the first point A and the second point B is 180° or less. For example, the angular measure θ between the first point A and the second point B is in the range of 180° and 10° (e.g., approximately 160° in an example embodiment), in various embodiments. In various embodiments, the angular measure θ is greater than 0°.

In various embodiment, the back cover 120 is textured. For example, the back cover 120 may comprise an alternating series of fins or ridges 122 and valley portions 124. In various embodiments, the back cover 120 is flat in the valley portions 124 (e.g., a plane that follows the curve of the cross-section perimeter 108). In various embodiments, the fins or ridges 122 extend outward from the surface of the back cover 120 of the valley portions 124. In various embodiments, the fins or ridges 122 are spaced apart by the valley portions 124. In various embodiments, the fins and/or ridges 122 may be configured to radiate heat. For example, the LED packages 136 and/or driver circuitry 140 may generate heat during operation of the LED lamp and/or light module 100. The heat may pass via a thermal communication channel to the fins and/or ridges 122 (possibly via a heat sink). The heat may then be radiated out from the fins and/or ridges 122 into the environment surrounding the LED lamp and/or light module. In an example embodiment, the fins and/or ridges 122 extend outward in the range of 1/32 of an inch to one half an inch from the valley portions 124. In an example embodiment, the fins and/or ridges 122 extend outward approximately 1/16 of an inch to 1/8 of an inch from the valley portions 124. In an example embodiment, the valley portions 124 are flat (e.g., rather than following the curve of the ovular, elliptical, and/or tear-drop cross-section of the LED lamp and/or light module 100) and/or recessed (e.g., with respect to the curve of ovular, elliptical, and/or tear-drop cross-section perimeter 108 of the LED lamp and/or light module 100). In an example embodiment, the valley portions do follow the curve of the ovular, elliptical, and/or tear-drop cross-section perimeter 108 (e.g., the dashed line between points A and B in FIG. 12) of the LED lamp and/or light module 100.

In various embodiments, the back cover 120 may be made of plastic, aluminum, and/or other appropriate material. In various embodiments, when the back cover 120 is made of aluminum or another conductive material, the back cover 120 is electrically insulated from the driver circuitry 140, circuit board 134, LED packages 136, and/or other electrical components of the LED lamp and/or light module 100. In various embodiments, the back cover 120 may be white, off-white, and/or another color appropriate for the application. In an example embodiment, the back cover 120 is white and/or off-white so as to reduce the amount of heat absorbed by the back cover 120 from the environment surrounding the LED lamp and/or light module 100.

In an example embodiment, the alternating series of fins and/or ridges 122 and valley portions 124 extends the entire length d of the LED lamp and/or light module 100. For example, in an example embodiment, the alternating series of fins and/or ridges 122 and valley portions 124 extends the entire back cover 120 from the first end cap 110A to the second end cap 110B. In an example embodiment, the alternating series of fins and/or ridges 122 and valley portions 124 extends a majority of the length d of the LED lamp and/or light module 100 (e.g., the majority of the back cover 120 between the first end cap 110A and the second end cap 110B). For example, the back cover 120 may include a label portion 126, in an example embodiment. For example, the label portion 126 may be a smooth portion having information/data corresponding to the LED lamp and/or light module 100 printed thereon. In an example embodiment, information/data corresponding to the LED lamp and/or light module 100 may be applied to the label portion 126 via a sticker and/or other adhesive technique. For example, the label portion 126 may be a smooth portion of the back cover 120 configured to having information/data corresponding to the LED lamp and/or light module 100 affixed thereto and/or printed thereon. In an example embodiment, the information/data corresponding to the LED lamp and/or light module 100 comprises a color temperature that the LED lamp and/or light module 100 is configured to emit light at, a voltage that the LED lamp and/or light module 100 is configured to have applied to its electrical contacts 118, a number of LED packages in the LED lamp and/or light module 100, a module number for the LED lamp and/or light module 100, a serial number or manufacturing lot number for the LED lamp and/or module 100, and/or other information/data corresponding to the LED lamp and/or light module and/or operation/use thereof.

Exemplary Emitting Portion

In various embodiments, the LED lamp and/or light module 100 comprises an emitting portion 130 that extends between the first end cap 110A and the second end cap 110B. In various embodiments, the light emitting portion 130 corresponds to more than half (e.g., 50%) of the perimeter of the LED lamp and/or light module 100. For example, in a cross-section of the LED lamp and/or light module 100 taken in a plane perpendicular to the cylinder axis 102, the envelope 132 of light emitting portion 130 may provide an arc that is approximately half or more of the oval, ellipse, and/or tear-drop of the cross-section perimeter 108. For example, the envelope 132 may extend from a first point A located on a first side of the intersection of the minor axis 106 and the cross-section perimeter 108 to a second point B located on the first side of an opposite intersection of the minor axis 106 and the cross-section perimeter 108. The angular measure φ between the first point A and the second point B is 180° or more. For example, the angular measure φ between the first point A and the second point B is in the range of 180° and 350° (e.g., approximately 200° in an example embodiment), in various embodiments. In various embodiments, the angular measure φ is less than 360°.

In various embodiments, the emitting portion 130 of the LED lamp and/or light module 100 corresponds to the portion of the LED lamp and/or light module 100 that emits light outward from the LED lamp and/or light module 100. For example, the emitting portion 130 comprises an envelope 132 that, along with the back cover 120, completes the cross-section perimeter 108. In various embodiments, the envelope 132 is clear, transparent, semi-transparent, translucent, semi-translucent, and/or the like. For example, the envelope 132 may allow at least a portion of light emitted by the LED packages 136 to be emitted outward from the LED lamp and/or light module 100. In various embodiments, the envelope is made of plastic, glass, or another clear, transparent, semi-transparent, translucent, and/or semi-translucent and/or insulating material.

In various embodiments, LED lamp and/or light module 100 comprise driver circuitry 140 and/or at least one LED package 136 that are housed within the compartment or cavity 105 defined by the back cover 120, envelope 132, and the end caps 110A, 110B. For example, the back cover 120, envelope 132, and end caps 110A, 110B may define a housing that defines a compartment and/or cavity 105 that houses the driver circuitry 140 and/or at least one LED package 136. In an example embodiment, a heat sink is also housed within the compartment 105. In an example embodiment, a circuit board 134 functions as a heat sink. In various embodiments, the heat sink comprises at least a portion of a thermal communication channel between the driver circuitry 140 and/or at least one LED package 136 to the fins and/or ridges 122 of the back cover 120.

In various embodiments, the driver circuitry 140 and/or at least one LED package 136 may be coupled to a circuit board 134. For example, the driver circuitry 140 may be mounted to a first side of a circuit board 134. For example, the driver circuitry 140 may be in electrical communication with traces 138 of a circuit board 134 and/or mechanically coupled to a first side of the circuit board 134. In various embodiments, the at least one LED package 136 is mounted to a second side of a circuit board 134. For example, the at least one LED 136 may be in electrical communication with traces 138 of a circuit board 134 and/or mechanically coupled to a second side of the circuit board 134. In an example embodiment, the first side of the circuit board 134 is opposite the second side of the circuit board 134.

Exemplary Circuit Board

In various embodiments, the LED lamp and/or light module 100 comprises a circuit board 130. In various embodiments, the circuit board 134 may be a rigid circuit board such as a rigid PCB, aluminum board, and/or the like. In an example embodiment, the circuit board 134 may be a flexible circuit board, a curved circuit board, and/or the like. In an example embodiment, the circuit board 134 may have a thermally conductive core. For example, the circuit board 134 may have a metal (e.g., aluminum) core. In the illustrated example embodiment, the circuit board 134 is generally rectangular in shape, though various other shapes are the circuit board 134 are contemplated. In the illustrated embodiment, the circuit board 134 is curved in accordance with the curvature of the ovular, elliptical, and/or tear drop cross-section of the LED lamp and/or light module 100 taken in a plane substantially perpendicular to the cylinder axis 102. In various embodiments, the circuit board 134 comprises a first side 135A and a second side 135B. The first side 135A and the second side 135B are both approximately planar and/or flat. However, in an example embodiment, both the first side 135A and the second side 135B exhibit curvature so as to define a partial arc in a cross-section take in a plane substantially perpendicular to the cylinder axis 102. For example, the circuit board 134 may be approximately planar and/or flat and curved to form a partial ovular, elliptical, and/or tear-drop cylinder. In an example embodiment, the circuit board 134 may extend from the first point A to the second point B in an arc having the angular measure φ in the range of 180° and 350° (e.g., approximately 200° in an example embodiment), in various embodiments. In various embodiments, the angular measure φ is less than 360°.

One or more LED packages 136 may be mounted to the second side 135B of the circuit board 134. Components of the driver circuitry 140 may be mounted to the circuit board 134 on the first side 135A. For example, the first and/or second sides 135A, 135B may comprise leads/traces 142. In an example embodiment, the one or more LED packages 136 are mounted to and/or in electrical communication with one or more leads/traces 142 (e.g., on the second side 135B) of the circuit board 134. In an example embodiment, components of the driver circuitry 140 may be mounted to and/or in electrical communication with one or more leads/traces 142 (e.g., on the first side 135A) of the circuit board 134.

In an example embodiment, the circuit board 134 is thermally conductive. For example, in an example embodiment, the circuit board 134 may act as a heat sink for heat generated by the one or more LED packages 136 and/or driver circuitry 140 during operation of the LED lamp and/or light module 100. In an example embodiment, the circuit board 134 is in thermal communication with the back cover 120, such that heat generated during the operation of the LED lamp and/or light module 100 may be radiated out through the back cover 120 (e.g., via the fins and/or ridges 122). For example, the circuit board 134 may provide a portion of the thermal communication channel between the heat generating elements of the LED lamp and/or light module 100 (e.g., LED packages 136 and/or driver circuitry 140) and the environment surrounding the LED lamp and/or light module.

Exemplary LED Packages

In example embodiments, the LED lamp and/or light module 100 comprises one or more LED packages 136. For example, at least one LED package 136 is mounted to a second side 135B of the circuit board 134. In an example embodiment, a plurality of LED packages 136 are mounted to the second side 135B of the circuit board 134 and/or in electrical communication with leads/traces 142 of the circuit board 134. In various embodiments, each LED package 136 is mounted to the circuit board 134 in electrical communication with a corresponding set of LED leads 142. In various embodiments, the plurality of LED packages 136 may be mounted to, disposed on, and/or mechanically and electrically coupled to the circuit board 134 in a predetermined pattern. In various embodiments, the predetermined pattern may be a series of aligned columns, as shown, for example, in FIG. 1, a series of aligned rows, a series of offset columns, a series of offset rows, as shown for example, in FIG. 15, and/or the like. In an example embodiment, the plurality of LED packages 136 may be mounted to, disposed on, and/or mechanically and electrically coupled to the circuit board 134 such that there are two to six LED packages per inch of length d. In an example embodiment, the plurality of LED packages 136 are evenly distributed along the length d. For example, the plurality of LED packages 136 may be mounted to, disposed on, and/or mechanically and electrically coupled to the circuit board 134 such that there are three or four LED packages along each inch of length d. For example, the plurality of LED packages 136 may be mounted to, disposed on, and/or mechanically and electrically coupled to the circuit board 134 such that there are three or four columns of LED packages 136 along each inch of length d. In an example embodiment, the plurality of LED packages 136 may be organized into rows that are distributed on the arc about the angular measure cp. In an example embodiment, a row that is adjacent and/or neighboring the back cover 120 may have a larger number of LED packages than a row that is not adjacent and/or neighboring the back cover. For example, a first row that is directly adjacent the back cover 120 without any other rows between the first row and the back cover may comprise more LED packages 136 than a second row that is not adjacent the back cover 120.

In various embodiments, the plurality of LED packages 136 may be mounted to, disposed on, and/or mechanically and electrically coupled to the circuit board 134 in one to twenty rows about the angular measure cp. In an example embodiment, the plurality of LED packages 136 may be mounted to, disposed on, and/or mechanically and electrically coupled to the circuit board 134 in six rows evenly distributed about the angular measure cp. For example, the plurality of LED packages 136 may be the plurality of LED packages 136 may be mounted to, disposed on, and/or mechanically and electrically coupled to the circuit board 134 in one to four rows for each inch of arc about the angular measure cp. For example, the plurality of LED packages 136 may be the plurality of LED packages 136 may be mounted to, disposed on, and/or mechanically and electrically coupled to the circuit board 134 in two to three evenly distributed rows in each inch of arc about the angular measure cp. In an example embodiment, the one or more LED packages 136 comprises forty-eight LED packages. In an example embodiment, the one or more LED packages 136 comprises 68 LED packages.

In example embodiments, an LED package 136 comprises one or more LED chips, electrical contacts, and optionally phosphor (e.g., to cause the LED package to emit white light). The LED package 136 may further comprise encapsulant to protect the one or more LED chips, wire bonds, and the phosphor. In an example embodiment, the LED packages 136 may comprise one or more alternate current (AC) driven LEDs. In some embodiments, the LED package 136 may further comprise one or more optical elements. For example, the LED package 136 may comprise one or more primary optical elements. In an example embodiment, the one or more of the LED packages 136 may be configured to emit light of at least one of 2700K, 3000K, 3500K, 4000K, 5000K, 5700K, 6000K, 7000K, 7500K and/or other color temperatures, as appropriate for the application.

In example embodiments, the one or more LED packages 136 may be in electrical communication with driver circuitry 140 (e.g., via corresponding leads/traces 142) such that the one or more LED packages 136 may be operated by the driver circuitry 140. For example, the driver circuitry 140 may provide a controlled electrical current to at least one of the LED packages 136. In example embodiments, the one or more LED packages 136 may be configured to provide light that varies in brightness, color temperature, CRI, and/or the like based on the current provided to the one or more LED packages 136 by the driver circuitry 140. For example, the driver circuitry 140 may provide a particular current to an LED package 136 to cause the LED package 136 to provide light having particular light aspects or qualities. For example, the driver circuitry 140 may provide a pulsed signal (e.g., a pulse width modulated signal) to the LED package 136 (e.g., via the corresponding leads/traces 142) that causes the LED package 136 to adjust one or more light aspects or qualities of the light emitted by the LED package 136.

In example embodiments, the LED packages 134 may comprise one or more LED packages 134 that are configured to emit light other than "white" light. For example, the LED packages 134 may comprise one or more LED packages 134 configured to emit a red or amber light and/or the like.

Exemplary Driver Circuitry

In example embodiments, the driver circuitry 140 may be configured to provide a controlled electrical current to at least one of the LED packages 136 during operation of the LED lamp and/or light module 100. In various embodiments, the driver circuitry 140 may comprise a circuit portion configured to convert AC voltage into DC voltage. In some embodiments, the driver circuitry 140 may comprise a circuit portion configured to control the current flowing through the one or more LED packages 136. In certain embodiments, the driver circuitry 140 may comprise a circuit portion configured to dim the one or more LED packages 136. In an example embodiment, the driver circuitry 140 may be configured to provide a particular current to one or more of the LED packages 136 to provide light having specific light aspects or qualities (e.g., brightness, color temperature, CRI, and/or the like). For example, the driver circuitry 140 may be configured to drive one or more LED packages 136 such that the LED packages provide light having the desired light aspects or qualities. In various embodiments, additional circuit components may be present in the driver circuitry 140. Similarly, in various embodiments, all or some of the circuit portions mentioned here may not be present in the driver circuitry 140. In some embodiments, circuit portions listed herein as separate circuit portions may be combined into one circuit portion. As should be appreciated, a variety of driver circuitry configurations are generally known and understood in the art and any of such may be employed in various embodiments as suitable for the intended application, without departing from the scope of the present invention.

Exemplary End Caps and Coupling Elements

In various embodiments, the ends of the back cover 120 and emitting portion 130 are capped by the end caps 110. For example, the back cover 120 and the emitting portion 130 extend between the first and second end caps 110A, 110B. In various embodiments, the end caps 110A, 110B are coupled to the back cover 120, envelope 132, circuit board 134, and/or other component of the LED lamp and/or light module 100 via one or more mechanical fasteners 111 and/or the like. In various embodiments, the end caps 110 are substantially planar. In an example embodiment, the end caps 110 are made of an electrically isolating material, such as plastic and/or the like. In various embodiments, the end caps are ellipses and/or generally ovular, elliptical, and/or tear-drop in shape that are generally planar. In various embodiments, the end caps 110, back cover 120, and envelope 132 may act to enclose the compartment and/or cavity 105 within the LED lamp and/or light module 100 to prevent and/or diminish dirt, dust, and moisture from affecting the LED packages 136, driver circuitry 140, circuit board 134, and/or the like.

In various embodiments, a coupling element 112 extends outward from at least one of the end caps 110. For example, a coupling element 112 may extend outward substantially normal to an end cap 110. In various embodiments, a coupling element 112 extends outward from each of the first end cap 110A and the second end cap 110B. In various embodiments, the coupling element 112 may be configured to mechanically and/or electrically couple a first LED lamp and/or light module 100 to a second LED lamp and/or module (e.g., via a connector 200, see FIGS. 13 and 15). In various embodiments, the coupling element 112 may be configured to mechanically and/or electrically couple a first LED lamp and/or light module 100 into a fixture 300 (see FIG. 14).

In various embodiments, a coupling element 112 comprises a proximate portion 114 adjacent, neighboring, and/or extending out from the end cap 110. In various embodiments, a coupling element 112 comprises a distal portion 116 that extends outward from the proximate portion 114. In various embodiments, the width of the distal portion 116 is less than the width of the proximate portion 114. In an example embodiment, the proximate portion 114 has a square, circular, polygonal, and/or other cross section in a plane taken substantially parallel to a plane defined by the end cap 110 (e.g., taken in a plane substantially perpendicular to the normal of the end cap 110). In an example embodiment, the distal portion 116 has a square, circular, polygonal, and/or other cross section in a plane taken substantially parallel to a plane defined by the end cap 110 (e.g., taken in a plane substantially perpendicular to the normal of the end cap 110).

In various embodiments, the coupling element 112 is approximately three quarters of an inch long. For example, in various embodiments, the coupling element 112 is approximately half an inch to an inch and a quarter long. In various embodiments, the proximate portion 114 of the coupling element 112 is approximately half an inch long. For example, in an example embodiment, the proximate portion 114 of the coupling element is approximate half to three quarters (e.g., one third) the length of the coupling element 112. In an example embodiment, the distal portion 116 of the coupling element is approximately ⅛ inch to half an inch in diameter.

In various embodiments, a conductive element and/or electrical contacts 118 are embedded within the coupling element 112. For example, the electrical contact 118 may extend from the walls of a coupling recess 119 of the distal portion 116 of the coupling element 112, through the proximate portion 114 of the coupling element 112, and into the compartment and/or cavity 105 within the LED lamp and/or light module 100. For example, the electrical contact 118 may be in electrical communication with the driver circuitry 140 such that electrical power may be provided to the driver circuitry 140 via the electrical contact 118. In an example embodiment, the LED lamp and/or light module 100 may be grounded through an electrical contact 118 of one of the coupling elements 112 of the LED lamp and/or light module 100.

In an example embodiment, the distal portion 116 of the coupling element 112 comprises a coupling recess 119. In various embodiments, the walls (and/or at least a portion of the walls) of the coupling recess are lined with the electrical contact 118. For example, the coupling recess 119 may be configured to receive a pin (e.g., first or second pin 202, 206) or conductive element 306 therein such that the pin or conductive element is in electrical communication with the electrical contact 118. In an example embodiment, the pin and/or conductive element may be secured within the coupling recess 119 to mechanically couple the coupling element 112 to a connector 200 and/or a fixture 300 (e.g., via a friction fit).

FIG. 13 illustrates an example connector 200 that may be used to electrically and/or mechanically couple a first LED lamp and/or light module 100 to a second LED lamp and/or light module 100. For example, the connector 200 may comprise a first sleeve 204 defining a first receiving recess 203 and having a first pin 202 extending at least partially through the first receiving recess 203. The connector 200 may further comprise a second sleeve 208 defining a second receiving recess 207 and having a second pin 206 extending at least partially through the second receiving recess 207. In various embodiments, the sleeves 204, 208 may be made of plastic and/or another electrically insulating material. In an example embodiment, the first and second sleeves 204, 208 are coupled together by a central element 210. In an example embodiment, the first e pin 202 and the second pin 206 are in electrical communication within one another. For example, in an example embodiment, the first pin 202 and the second pin 206 are electrically conductive and are electrically coupled together via a conductive element 212 that passes through the central element 210. In an example embodiment, the first pin 202 and the second pin 206 are electrically isolated from one another. For example, the first pin 202 and the second pin 206 may be electrically isolated from one another by the central element 210. In such an example embodiment, the first pin 202 and the second pin 206 may be electrically conductive or insulative.

In various embodiments, the first and second receiving recesses 203, 207 are sized and shaped to receive at least a portion of the distal end 116 of the coupling element therein. In an example embodiment, the first and second pins 202, 206 are sized and shaped to be inserted into the coupling recess 119 in such a manner that the first and second pins 202, 206 are placed into electrical communication with the electrical contact 118. For example, the insertion of the distal end 116 of a coupling element 112 into the first receiving recess 203 may cause the first pin 202 to be inserted into the coupling recess 119 and to be electrically coupled to the electrical contact 118. Similarly, the insertion of the distal end 116 of a coupling element 112 into the second receiving recess 207 may cause the second pin 206 to be inserted into the coupling recess 119 and to be electrically coupled to the electrical contact 118. In various embodiments, the distal end 116 may be configured to be retained within the first or second receiving recess 203, 207 via a friction fit. In an example embodiment, the first and/or second receiving recesses 203, 207 may be configured to receive at least a portion of the proximate portion 114 of the coupling element 112 therein, in addition to the distal portion 116 of the coupling element 112. In an example embodiment, two or more LED lamps and/or light modules may be “daisy-chained” together via one or more connectors 200 a longer combined LED lamp and/or light module 150 (see FIG. 14). For example, the one or more connectors 200 may act to mechanically couple the two or more LED lamps and/or light modules and to electrically couple (e.g., in serial communication) the two or more LED lamps and/or light modules such that the combined LED lamp and/or light module 150 may be operated as a single LED lamp and/or light module, while still allowing for individual LED lamps and/or light modules 100 to be individually replaced.

In various embodiments, an LED lamp and/or light module 100 and/or a combined LED lamp and/or light module 150 may be installed in a fixture 300, as shown in FIG. 14. In various embodiments, the LED lamp and/or light module 100 and/or combined LED lamp and/or light module 150 may be mechanically and/or electrically coupled into a fixture 300 via coupling elements 112 of the LED lamp and/or light module 100 and/or combined LED lamp and/or light module 150. For example, the fixture 300 may comprise one or more receiving elements 302. A receiving element 302 may define a receiving element recess 304 having a conductive element 306 extending at least partially through the receiving element recess 304. In an example embodiment, the conductive element 306 is in electrical communication with an electrical power source such as a battery power source, line voltage, and/or the like.

In various embodiments, the receiving element recesses 304 is sized and shaped to receive at least a portion of the distal end 116 of the coupling element therein. In an example embodiment, the conductive element 306 is sized and shaped to be inserted into the coupling recess 119 in such a manner that the conductive element 306 is placed into electrical communication with the electrical contact 118. For example, the insertion of the distal end 116 of a coupling element 112 into the receiving element recess 304 may cause the conductive element 306 to be inserted into the coupling recess 119 and to be electrically coupled to the electrical contact 118. In various embodiments, the distal end 116 may be configured to be retained within the receiving element recess 306 via a friction fit. In an example embodiment, the receiving element recess 304 may be configured to receive at least a portion of the proximate portion 114 of the coupling element 112 therein, in addition to the distal portion 116 of the coupling element 112. For example, the receiving element(s) 302 of the fixture 300 may act to mechanically and/or electrically couple an LED lamp and/or light module 100 and/or a combined LED lamp and/or module 150 into the fixture 300.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An LED light module comprising:
an emitting portion defining a first curved surface;
at least one LED package disposed within the LED light module; and
a back cover defining a second curved surface,
wherein the first curved surface and the second curved surface define a perimeter of the LED light module, wherein the first curved surface has a first radius of curvature, the first curved surface has an arc angle greater than 180°, and the second curved surface has a second radius of curvature, the first radius of curvature being greater than the second radius of curvature.

2. The LED light module of claim 1, wherein each of the first curved surface and the second curved surface extend a first length along a cylindrical axis defined by the LED light module.

3. The LED light module of claim 2, wherein, in a cross-section of the LED light module taken in a plane perpendicular to the cylindrical axis, the perimeter is ovular.

4. The LED light module of claim 1, wherein the second curved surface has an arc angle that is at least 10° and less than 180°.

5. The LED light module of claim 1, wherein the first curved surface comprises a translucent material.

6. The LED light module of claim 1, further comprising a heat sink, wherein the heat sink is in thermal communication with the back cover so that heat generated during operation of the LED light module is radiated out through the back cover.

7. The LED light module of claim 6, wherein the heat sink is housed within a cavity defined by the first curved surface and the second curved surface.

8. The LED light module of claim 1, further comprising:
a circuit board and driver circuitry, wherein each of the driver circuitry and the at least one LED package is at least one of electrically or mechanically coupled to the circuit board.

9. The LED light module of claim 8, wherein the back cover is made from conductive material, and the back cover is electrically insulated from the at least one LED package, the circuit board, and the driver circuitry.

10. The LED light module of claim 8, wherein the at least one LED package is at least one of mechanically or electrically coupled to the circuit board so as to be organized into rows that are distributed on the circuit board.

11. The LED light module of claim 8, wherein the circuit board is arc-shaped.

12. The LED light module of claim 8, wherein the circuit board is planar.

13. The LED light module of claim 1, further comprising:
at least one end cap.

14. The LED light module of claim 13, wherein the at least one end cap is ovular.

15. The LED light module of claim 13, wherein the at least one end cap comprises a coupling element configured to at least one of electrically or mechanically couple the LED light module to a subsequent LED light module or to a fixture.

16. The LED light module of claim 15, wherein the coupling element comprises an electrical contact embedded within the coupling element, wherein the LED light module is grounded via the electrical contact.

17. A combined LED light module comprising:
a first LED light module and a second LED light module, wherein the first LED light module and the second LED light module are coupled to one another, each of the first LED light module and the second LED light module respectively comprising:
an emitting portion defining a first curved surface; and
a back cover defining a second curved surface, wherein the first curved surface and the second curved surface define a perimeter of the LED light module, wherein the first curved surface has a first radius of curvature and an arc angle greater than 180°, and the second curved surface has a second radius of curvature, the first radius of curvature being greater than the second radius of curvature.

18. The combined LED light module of claim 17, wherein each of the first LED light module and the second LED light module further comprises:

at least one end cap, the at least one end cap comprising a coupling element configured to couple the LED light module to a subsequent LED light module or to a fixture.

19. An LED lighting fixture comprising:

a fixture configured to have at least one LED light module installed therein; and the at least one LED light module coupled to the fixture, the at least one LED light module comprising:

an emitting portion defining a first curved surface; and a back cover defining a second curved surface, wherein the first curved surface and the second curved surface define a perimeter of the LED light module, wherein the first curved surface has a first radius of curvature, the first curved surface has an arc angle greater than 180°, and the second curved surface has a second radius of curvature, the first radius of curvature being greater than the second radius of curvature.

20. The LED lighting fixture of claim 19, wherein the at least one LED light module further comprises:

at least one end cap, the at least one end cap comprising a coupling element configured to couple the at least one LED light module to a subsequent LED light module or to the fixture, wherein the at least one LED light module is coupled to the fixture via the coupling element.

* * * * *